Sept. 8, 1970  E. B. CLARK, JR  3,526,964
FLEXIBLE MEASURING TAPE SCRIBER
Filed Oct. 2, 1968  2 Sheets-Sheet 1
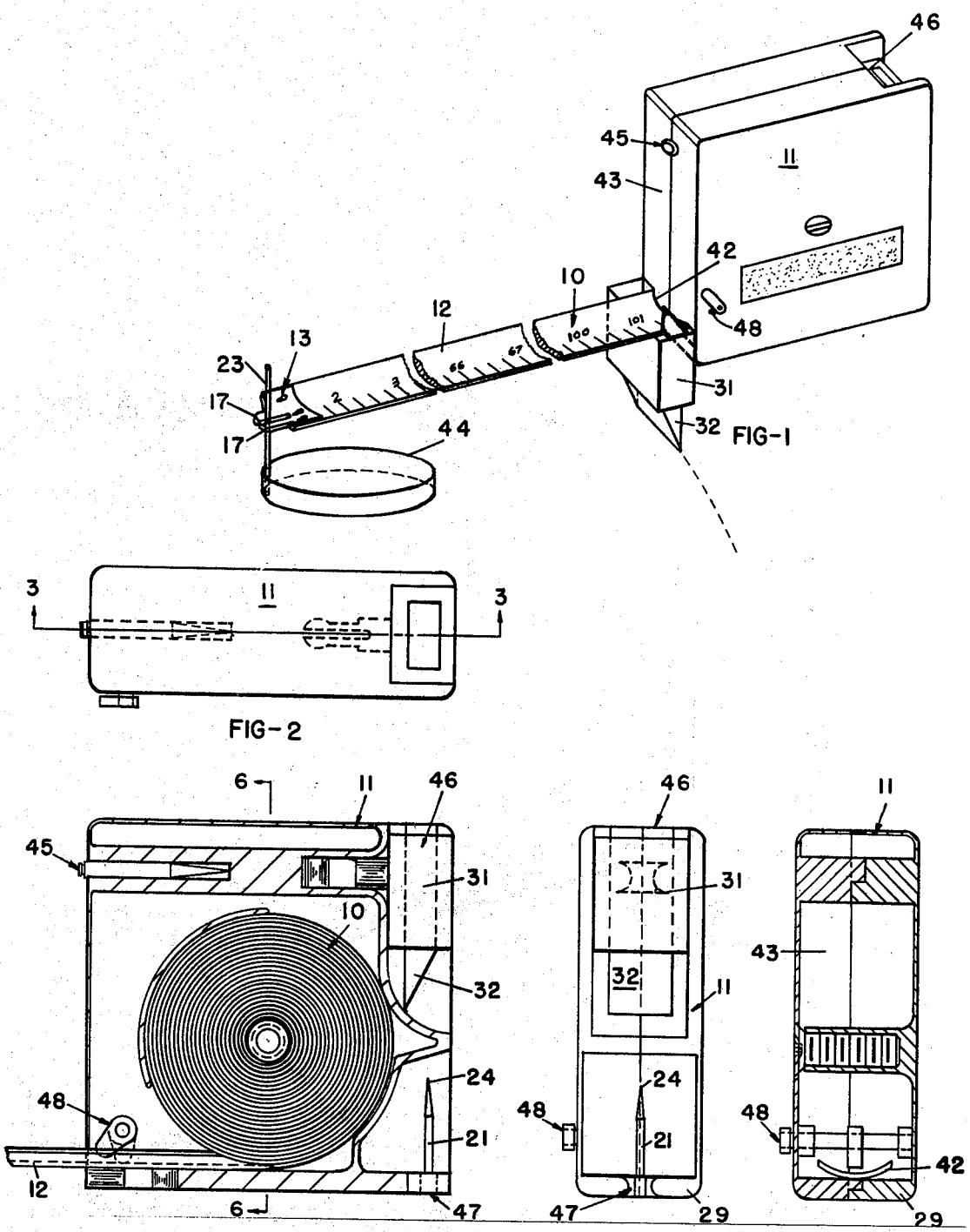

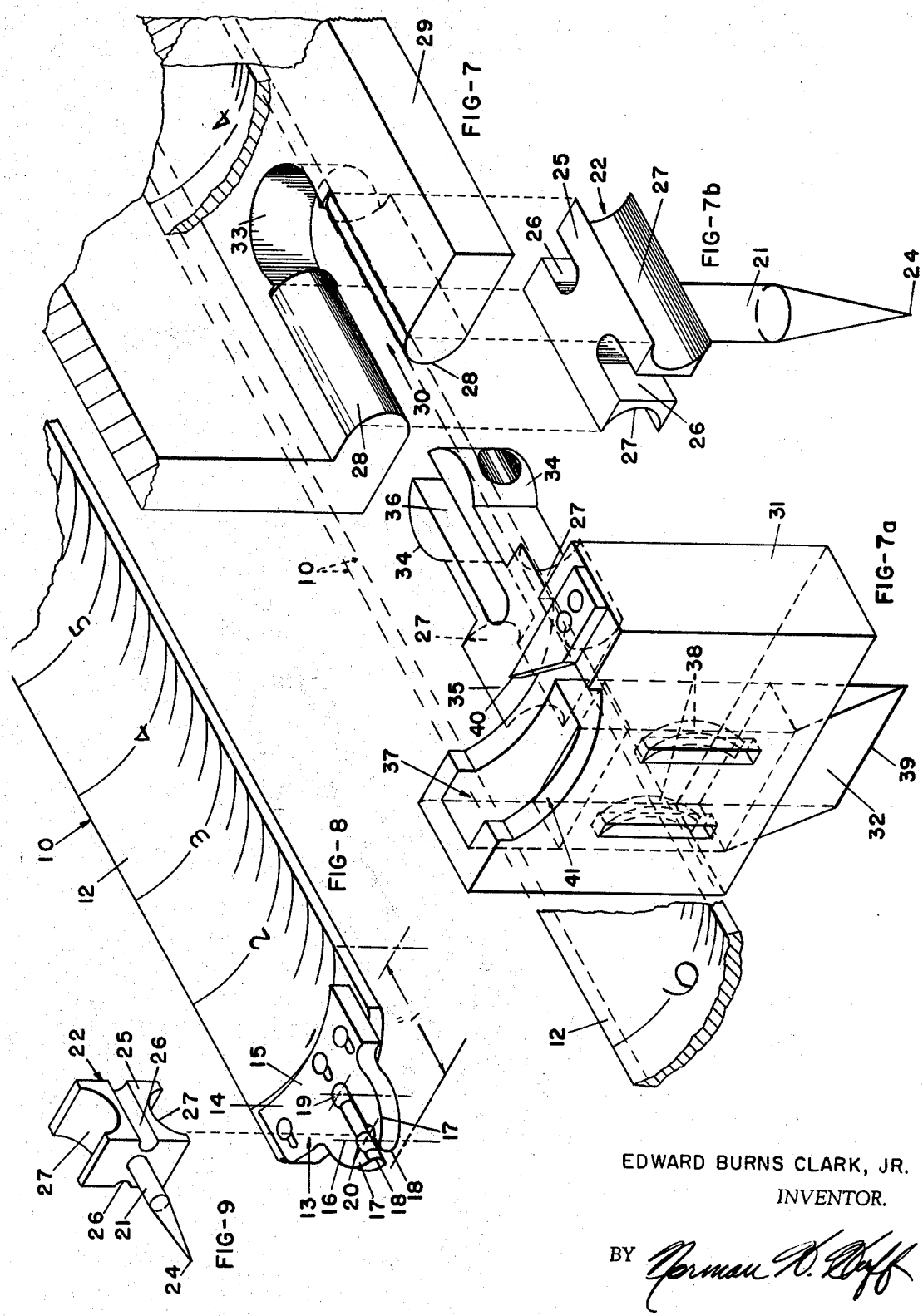

United States Patent Office 3,526,964
Patented Sept. 8, 1970

3,526,964
FLEXIBLE MEASURING TAPE SCRIBER
Edward Burns Clark, Jr., Curlew, Wash.
(Box 57, Miami, Ariz. 85539)
Filed Oct. 2, 1968, Ser. No. 764,584
Int. Cl. B43l 9/04
U.S. Cl. 33—27
8 Claims

ABSTRACT OF THE DISCLOSURE

A craftsman's flexible measuring tape having an adaptor on the housing holding a scribe and an indicator at coincident points relative to the calibration of the tape and a tape end adaptor to hold a scribe on the "Zero" digit of the tape calibration to serve as an anchor about whose axis measured arcs may be scribed, and to hold a profile chaser.

---

This invention relates to a craftsman's flexible measuring tape comprising a blade or tape coiled in a case for storage and which may be withdrawn selective distances for use. More particularly, this invention relates to improvements in flexible measuring tapes and cases to greatly enlarge their utility.

Devices of this type commonly have tapes that are six to twelve feet long and are used by carpenters and other craftsmen for layouts during the construction of buildings and their appurtenances. Many such measuring tapes have been widely available for many years but the prior devices suffer from being limited in their utility or facility for specific job functions.

Most such prior art tapes comprise a coiled flexible tape having a hook on its free end, calibrated for its useable length and automatically or manually retractable into a case or housing. They are well adapted for measuring distances but their utility is usually restricted to this single functions.

The present invention seeks to extend the utility of devices of this class by providing a combination of physical embodiments which cooperate with a flexible measuring tape to facilitate various functions encountered during the construction and finishing of buildings and analogous activities of the craftsmen.

It is therefore one object of the present invention to provide an improved craftsman's scale of the type described which will function as: a pair of trammels to form a beam compass or dividers; a device to profile interfitting members; a gauge for making parallel lines; and many additional functions which become apparent to one skilled in the art to which this invention appertains.

It is therefore a further object of the present invention to provide a craftsman's tape with scribing devices, one at the "Zero" digit of the conventional calibrations and the other fixed with respect to the tape housing and at a point observable with respect to the tape calibrations so that the exact measurement between the scribes will be visually evident.

Another object of the present invention lies in the provision of scribes, one of which may additionally serve as an anchor about the axis of which the companion scribe may mark a curve or circle of manually selected radii.

Yet another object of the present invention lies in the provision of selectively changeable scribes formed of marking material, for example, pencil lead or metal.

A still further object is to provide an adaptor releasably anchored to said housing and having an indicator and a coincident scribe constructed and arranged so that the indicator points to the exact tape calibration as corresponds to the distance from the tape's "Zero" digit to the scribe.

It is yet another object of the present invention to provide means for storing certain members in the housing which may not be in use for the time being.

The foregoing and other objects and advantages of the present invention will become more apparent and meaningful during the course of the following specification when considered in association with the accompanying drawings wherein a preferred form of the invention is graphically illustrated. It is to be understood, however, that the drawings are illustrative only and are not intended to limit the scope of the invention. It should also be understood that various changes in construction may be resorted to in the course of manufacture without in any way departing from the spirit of the invention. Furthermore, it is to be understood that while the invention is described in one particular association, it is not my intention to unnecessarily limit the applicability of the invention, but I desire to reserve to myself the claimed invention for every use of which is it now known or subsequently discovered to be susceptible.

Other advantages and features of this invention will become apparent from the more detailed description following in which like reference numerals are employed to designate similar parts in the accompanying drawings, wherein:

FIG. 1 is a perspective view of my improved craftsman's tape showing the adaptor in phantom associated therewith;

FIG. 2 is a plan veiw of the housing;

FIG. 3 is a sectional view taken on a vertical plane substantially as indicated by line 3—3 of FIG. 2;

FIG. 4 is a bottom view of the housing;

FIG. 5 is an elevation of the right hand end wall as viewed in FIG. 2;

FIG. 6 is a lateral sectional view taken substantially on the plane indicated by line 6—6 of FIG. 3;

FIGS. 7, 7a and 7b are perspective views of respectively a fragmentary portion of the housing, the adaptor with a marking scribe and pointer and a metal scribe, in exploded relationship and associated by dotted extension lines;

FIG. 8 is a fragmentary perspective of the extended free end of the tape showing its means for releasably holding various members; and FIG. 9 is a reduced scale perspective view of the scribe seen in FIG. 7b and in exploded relationship to the tape end holding means.

Referring now in greater detail to the drawings, like reference numerals are employed to designate the same or similar parts throughout the several views.

Reference numeral 10 identifies the conventional flexible, calibrated tape susceptible of being convolved within the case or housing 11 and having an axially extending portion 12 according to manual selection. At its free end, the tape 10 is provided with holding means 13 which comprises a generally T-shape plate 14 having its cross head 15 riveted or otherwise secured to the free end of the tape 10 and its standard 16 extending axially parallel to the axis of the extended portion 12 of the tape. Since the tape's extended portion is laterally arcuate, the holding means 13 is shaped to conform.

It is clearly shown that the standard 16 of the T-shape plate 14 is bifurcated to form a pair of spaced parallel arms 17—17. The bifurcation slot is defined by spaced parallel convex edge faces 18—18 which are shown each to be a section of a cylinder and the slot thus formed terminates at its inner extremity with a cylindrical enlarged socket 19 having its axis perpendicular to the axis of the extended tape 12.

Spaced outwardly along the bifurcation is a second socket 20 adjacent to the outer ends of the arms 17—17. Socket 20 is defined by cylindrical segments cut from the edge faces 18—18 with its axis at right angles to the axes of the faces 18—18 and disposed on the "Zero" digit of the tape calibration. The cylindrical body 21 of the scribe 22 is of a diameter to fit into the socket 20 and form a spindle about which the tape 10 can be rotated. Preferably, the caliper of the metal scribe body 21 is substantially the same as a 60 or 40 nail 23 commonly used by carpenters when one chooses to substitute.

The arms 17—17 being somewhat yieldable or flexible makes it possible to effect removal of the tape from the body 21 or nail 23 by exerting a tensioning force to the tape from any remote distance.

The scribe 22 has the body 21 sharpened to a point 24 at its axis to facilitate scribing by scratching the surface to be scribed and also to facilitate its serving as a pivot point when trammeling or when the tape is employed as a compass. When the scribe 22 cannot be hand held, as when scribing a large radius curve, it can be driven into a board (not shown) in similar fashion as a nail by striking its head 25. The head has opposed arcuate grooves 26—26 axially parallel to the scribe 21 and each other to frictionally receive the arcuate edges 18—18 of fingers 17—17 and in this association serves as a profile chaser as when scribing a member to interfit with an uneven surface, as for example, when building forms for poured concrete to fit a rock face.

The head has also spaced parallel concave arcuate cylindrical segments 27—27 extending athwart of the grooves 26—26 which are of a radius adapted to interfit with the convex cylindrical spaced edges 28—28 of the bottom well 29 of the housing or case 11 defining the slot 30 so that the scribe 22 may also be used as a pivot point or trammel on the housing 11 when desired. Principally the scribe 22 will be used at the free end of the tape 10 either as a profile chaser, trammel point or axis for scribing a radius.

In each of these events, the slot 30 is employed to releasably secure an adaptor 31 which carries a scribe 32. FIG. 7a shows a pencil-lead scribe 32 but it will be understood that a metal scratching scribe may be used as desired. At its inner end, the slot terminates in an enlarged socket 33 which is cylindrical with a vertical axis and is adapted to receive the enlarged protuberances 34—34 together defining a cylinder-like external configuration for mating with said socket 33. The adaptor has an arm 35 shaped to correlate with the edge faces 28—28 of the slot 30 and bifurcated at 36 to admit of flexing of the free end inwardly to permit the protuberances 34—34 to be forced toward each other sufficiently to traverse the slot 30 and thence expand in the socket 33 and thereby releasably and frictionally anchor the adaptor to the housing 11. At diametrically opposed sides, the arm 35 has parallel concave cylindrical segments 27—27 of a radius to mate with edges 28—28 and rigidly fix the adaptor against accidental displacement.

The adaptor 31 has a vertical bore 37 through which the scribe 32 is inserted and in which it is adjustably held by resilient fingers 38 struck from the walls of the adaptor. In horizontal section, I have shown the bore to be rectangular but it is to be understood that any desired sectional configuration may be employed. The scribe 32 is sharpened to a point or edge 39 coincident to the pointer or indicator 40 carried by the adaptor.

With the adaptor 31 united with the housing 11 as hereinabove described, the tape extension 12 passes through a relieved portion 41 under the indicator 40 so the indicator shows on the calibration of the tape 10 the exact location of the scribe edge or point 39. Since the "Zero" digit of the tape is at the axis of the pin 21 or nail 23 in the socket 20 arcs of exact measurement may be scribed by one workman. With the scribe 21 disposed axially parallel to the axis of the extended tape 12, the scribe edge or point 39 will draw a profile as the scribe 21 follows the surface.

The slot 30 is formed in the bottom wall 29 of housing 11 where it is contiguous to the front wall 43 and this is the location of the opening 42 through which the tape 10 is movable.

Scribe 21 or nail 23 may be removably anchored in a weight 44 if it is preferred not to drive into the work.

Means 45, 46 and 47 are provided in the housing for storing the several pieces when not in use. Also a conventional tape lock 48 may be provided as desired.

Obviously, with the parts having correlating and matting sizes, the adaptor 31 may be carried by the arms 17—17 at the free end of the tape when desired and the scribe 22 may be employed in the slot 30.

Having thus described my invention, I desire to secure by Letters Patent of the United States the following:

1. In a craftsman's scale having a housing enclosing a metal coiled flexible measuring tape with its free end extendable therefrom and calibrated beginning with the "Zero" digit, the improvement comprising:
   an adaptor releasably attached to the housing at a fixed position;
   an indicator carried by said adaptor and disposed for the time being relative to the calibrations of said extended portion of said tape;
   a scribe on said adaptor disposed to scribe at a distance from said "Zero" digit coincidentally to the said indicator, whereby the indicator reveals on the calibrated tape the measurement between its "Zero" digit and the scribe; and
   means on the end of said tape adapted to releasably hold sequentially an anchor-pin scribe perpendicular to the axis if the extended tape at the "Zero" digit and a profile chaser axially parallel to said extended tape.

2. The structure of claim 1 further characterized by said means, comprising:
   a pair of spaced arms extending axially parallel at the free end of said tape and defining a bifurcation adapted to frictionally receive and releasably secure said profile chaser therebetween; and
   said bifurcal arms being adapted to frictionally receive and releasably hold said anchor-pin/scribe perpendicular to the axis of said tape at the "Zero" digit calibration thereof.

3. The structure of claim 2 further characterized by: an anchor-pin/scribe releasably secured in said means on the end of the tape.

4. The structure of claim 3 further characterized by: said anchor-pin/scribe having means for fixing said anchor-pin/scribe to facilitate movements of said tape about the axis of said anchor-pin/scribe.

5. The structure of claim 1 further characterized by said housing comprising:
   an end wall and a contiguous bottom wall;
   said end wall having an opening at its juncture with said bottom wall and constituting a passage for axial movements therethrough of said tape;
   said bottom wall having a slot defined by parallel edges terminating at their inner ends in a socket of greater dimension than the space between said edges; and
   said adaptor having a correlative portion inserted and releasably retained in said slot.

6. The structure of claim 5 further characterized by said correlative portion, comprising:
   an elongated bifurcated arm terminating at its free end in a protuberance adapted to mate with said socket and yieldable to admit of passing through said slot and subsequent expansion to fit said socket.

7. The structure of claim 1 further characterized by said adaptor and its correlative scribe being manually separable; and
   said scribe being formed of a marking material.

8. The structure of claim 1 wherein:
   said means on the end of said tape is secured thereto with a lost motion connection of such magnitude that when the means is extended away from the tape, the anchor-pin scribe holder is at the "Zero" digit and when said means is withdrawn toward the tape, the outer edge is at the "Zero" digit.

References Cited

UNITED STATES PATENTS

| | | | |
|---|---|---|---|
| 1,439,645 | 12/1922 | Sell | 33—137 |
| 2,169,785 | 8/1939 | Ayala | 33—173 |
| 2,400,343 | 5/1946 | Eskil | 33—27 |
| 3,336,678 | 4/1967 | Chamberlain et al. | 33—189 |

HARRY N. HAROIAN, Primary Examiner

U.S. Cl. X.R.

33—41, 138